No. 725,456. PATENTED APR. 14, 1903.
H. LEMP.
ELECTROMAGNETICALLY OPERATED STEERING CHECK.
APPLICATION FILED JUNE 5, 1902.
NO MODEL. 2 SHEETS—SHEET 1.
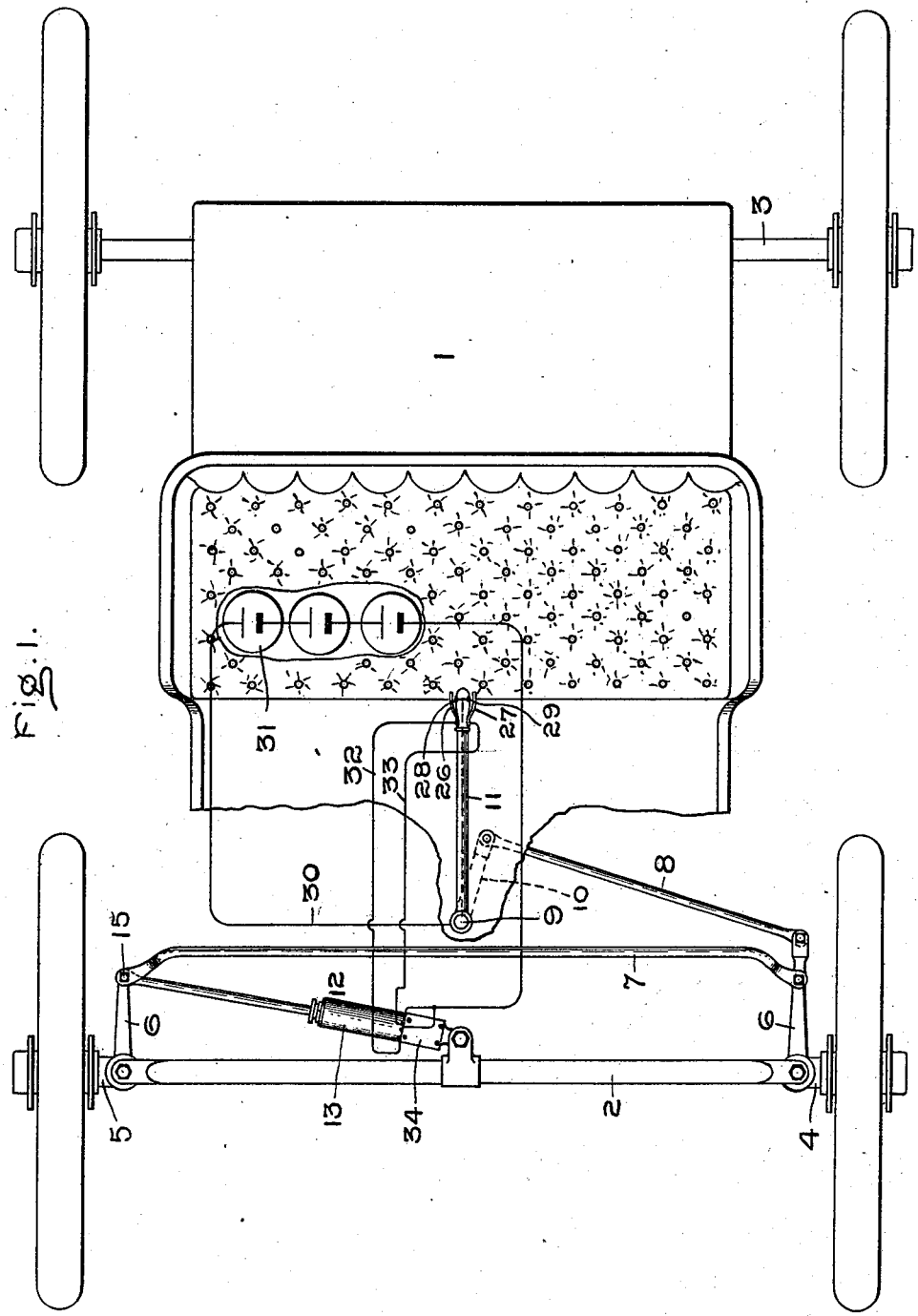
Witnesses:
Helen Orford
Alex F. Macdonald
Inventor
Hermann Lemp,
By Albert G. Davis
Att'y.

No. 725,456. PATENTED APR. 14, 1903.
H. LEMP
ELECTROMAGNETICALLY OPERATED STEERING CHECK.
APPLICATION FILED JUNE 5, 1902.
NO MODEL. 2 SHEETS—SHEET 2.
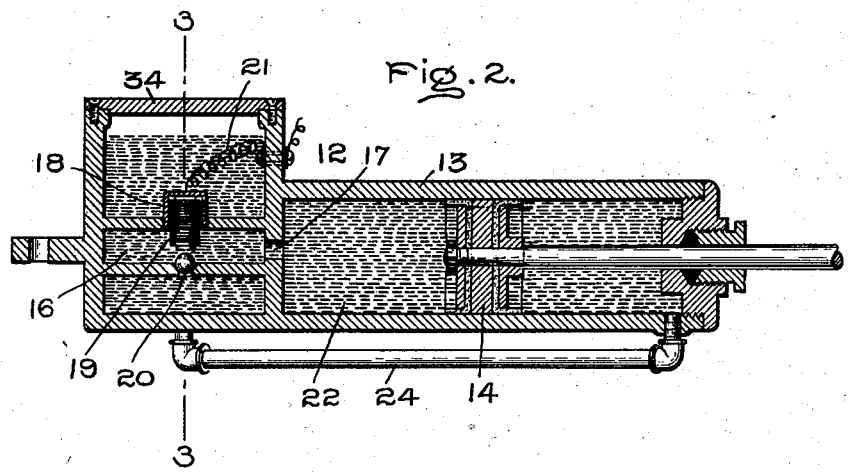
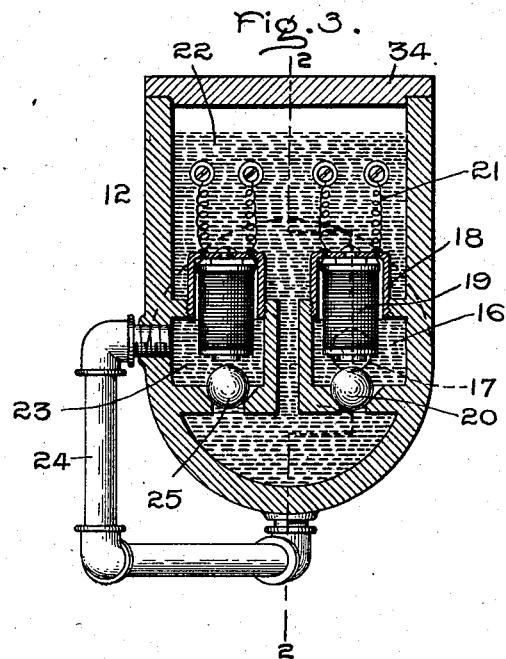
Witnesses:
Helen Orford
Alex F. Macdonald
Inventor,
Hermann Lemp,
By Allen G. Davis
Att'y.

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

ELECTROMAGNETICALLY-OPERATED STEERING-CHECK.

SPECIFICATION forming part of Letters Patent No. 725,456, dated April 14, 1903.

Application filed June 5, 1902. Serial No. 110,321. (No model.)

*To all whom it may concern:*

Be it known that I, HERMANN LEMP, a citizen of the United States, residing at Lynn, county of Essex, State of Massachusetts, have invented certain new and useful Improvements in Electromagnetically-Operated Steering-Checks, of which the following is a specification.

My invention relates to steering-checks which are situated between the steering handle or lever and the steering wheel or wheels to prevent the transmission of wheel strains to the handle.

The object of the present invention is to provide a simple steering-check which can be applied to existing vehicles without altering the steering mechanism except possibly in some minor detail. For a consideration of what I consider to be novel and of my invention attention is called to the specification and to the claims appended thereto.

In the drawings, which illustrate an embodiment of my invention, Figure 1 is a plan view of a vehicle. Fig. 2 is a longitudinal section of one of my improved steering-checks, taken on line 2 2 of Fig. 3; and Fig. 3 is a cross-section taken on line 3 3 of Fig. 2.

1 represents the vehicle-body, and 2 and 3 the front and rear axles. To the ends of the forward axle are pivotally secured short or stub axles 4 and 5, and each of these is provided with a lever 6, which is connected to the steering-lever through suitable means. The levers may extend rearwardly, as shown, or forward, as desired. In the latter case the steering-handle may be connected the same or differently. The axles and wheels form a part of the well-known double-axle steering mechanism. Connecting the short axles and extending parallel with the front axle is a rod 7, which causes similar deflections of the steering-wheels.

One of the levers 6 is slightly elongated, and to this elongation is pivotally secured a rod 8. The steering-shaft 9 is supported in suitable bearings on the vehicle-body, and on the lower end is affixed a lever 10, which is pivotally connected to the rod 8. To the upper end of the shaft is secured a steering handle or lever 11. The shaft and handle may be arranged as shown, or they may be arranged to form what is known as the "side-steering" arrangement without departing from my invention.

The arrangement thus far described is one of the common types of steering mechanism found on the market, and no special means are provided to prevent the road obstructions from imparting a thrust to the hand of the operator. It is very desirable to have some means to prevent this action, as it becomes very tiresome to steer where the road is rough, and it is also desirable to provide means whereby the operator may be permitted to temporarily drop the steering-handle. Such a means is found in the hydraulic check 12, which comprises a cylinder 13, that is pivotally secured to a holder carried by the front axle 2, and a piston 14, that is secured to one of the rearwardly-extending levers 6. Preferably the same pivot 15 is employed to unite the piston, lever 6, and connecting-rod 7.

The construction of the check itself is best shown in Figs. 2 and 3, wherein 13 represents a cylinder of ordinary construction which opens into the right-hand valved compartment 16 through the passage 17. The walls of the compartment are formed integral with the head to reduce the number of joints. The upper side of each compartment is provided with a screw-threaded opening arranged to receive the inverted cup or thimble like support 18. To the under side of the cup is secured an electromagnet 19, that controls the operation of the ball-valve 20, the latter having a conical seat in the lower wall of the compartment. Extending from the magnet to the side wall of the head are leads 21, by means of which current is conveyed to and from the magnet. The magnet is submerged in the non-elastic and normally quiescent fluid 22, which fills the casing, and preferably the fluid is of such a nature—as oil, for example—that it will insulate the turns of wire thereon. Situated opposite the first-mentioned valve or at any convenient place is a second valve, the construction of which is identical with the first; but the chamber or compartment 23 instead of opening into the same end of the cylinder as the compartment 16 is connected by a by-pass connection or pipe 24 with the opposite end. In other words, the valve 20 controls the passage of fluid from one end of the cylinder, while the valve 25 controls the passage from the opposite end, the connection 24 acting as a by-pass around the piston. When the valves are in the position shown, the piston 14 is locked against movement in either direction. Hence the steering-wheels are also locked.

In order to steer, it is necessary to provide means for positively opening one valve or the other, and, moreover, this opening should preferably take place without thought on the part of the operator. To accomplish this, two movable contacts 26 and 27 are placed on the handle and are arranged to engage with the fixed contacts 28 and 29. The contacts 28 and 29 are connected by the wire 30 with one side of the battery 31 or other source of energy, while the movable contacts 26 and 27 are connected by wires 32 and 33 with the magnets. The movable contacts are so positioned on the steering handle or lever 11 that in the natural course of steering one or the other is depressed sufficiently to close the circuit and energize the proper magnet to raise the valve and permit the fluid to pass from one side of the piston to the other when the latter is moved by the steering mechanism. As soon as the circuit of a given magnet is interrupted its valve will drop and prevent further passage of the fluid, and thus arrest the movement of the piston and steering-wheels. In steering the natural tendency is to press harder on one side of the lever than on the other, and this tendency is utilized in the manner specified. If for any reason it is desired to render the locking or checking mechanism inactive, both of the movable contacts can be brought into engagement with the stationary contact and the valves will remain open.

From the foregoing it will be seen that the standard steering mechanism remains unchanged, with the exception of the contacts on the handle, and these can be mounted on a small handle or grip, which is easily applied. The circuit-wires being flexible no trouble will be experienced in making the connections with the magnets or maintaining them in operation.

In order to insure a sufficient supply of fluid at all times, the end of the cylinder is somewhat enlarged to form a reservoir and is provided with a detachable cover 34.

What I claim as new, and desire to secure by Letters Patent of the United States, is—

1. In combination, a cylinder containing a body of fluid, a piston, and electromagnetically-controlled valves for controlling the movement of the piston.

2. In combination, a cylinder containing a body of fluid, a piston, magnetically-controlled valves for regulating the piston, and contacts for closing the circuits of the magnets.

3. In combination, a cylinder containing a body of fluid, a piston, a lever for moving the piston, a valve controlling the movements of the piston, an electromagnet for controlling the valve, and a contact carried by the lever for closing the circuit of the magnet.

4. In combination, a piston, a cylinder containing a body of fluid, separately-actuated gravity-valves for controlling the movements of the piston, a separate magnet for each valve, a lever for moving the piston, and contacts carried by the lever for closing and opening the circuits of the magnets.

5. In combination, a piston, a cylinder containing a body of fluid, two valves for controlling the movements of the piston, a separate magnet for each valve, a lever for moving the piston within the cylinder, contacts carried by the lever and so positioned thereon that one circuit or the other is closed depending upon which way the lever is moved, and circuit-wires extending from the contacts on the lever to the magnets.

6. In combination, a piston, a cylinder containing a body of fluid, and a magnet for controlling the piston which is submerged in the fluid.

7. In combination, a piston, a cylinder containing a body of fluid, chambers opening into the cylinder, a valve in each of said chambers, a magnet in each of said chambers for controlling the valve, a lever which is connected to the piston, and contacts on the lever for closing the circuits of the magnets.

8. In combination, a vehicle-body, a steering-wheel, a steering-lever for moving the wheel, a piston and cylinder which are secured to the wheel and to a fixed support on the vehicle, electromagnetically-controlled valves for opening and closing a by-pass around the piston, and contacts carried by the steering-lever for regulating the action of the valves.

9. In a vehicle, the combination of a body, a pair of steering-wheels, a connection between the wheels, a piston and cylinder which are connected to the wheels and to a fixed part of the vehicle, separately-actuated valves for regulating the action of the piston, a steering-lever, and contacts for regulating the action of the valves which are mounted on opposite sides of the lever so that when the lever is moved in one direction one circuit is closed, and when moved in the opposite direction a second circuit is closed.

10. In a steering-check, the combination of a cylinder containing a body of fluid, a piston working in said cylinder, separate chambers, a valve in each chamber, a reservoir which is connected to the cylinder, and magnets which act directly on the valves.

In witness whereof I have hereunto set my hand this 3d day of June, 1902.

HERMANN LEMP.

Witnesses:
DUGALD McK. McKILLOP,
HENRY O. WESTENDARP.